(No Model.)
J. E. EMERSON.
INSERTIBLE SAW TOOTH.
No. 311,301. Patented Jan. 27, 1885.
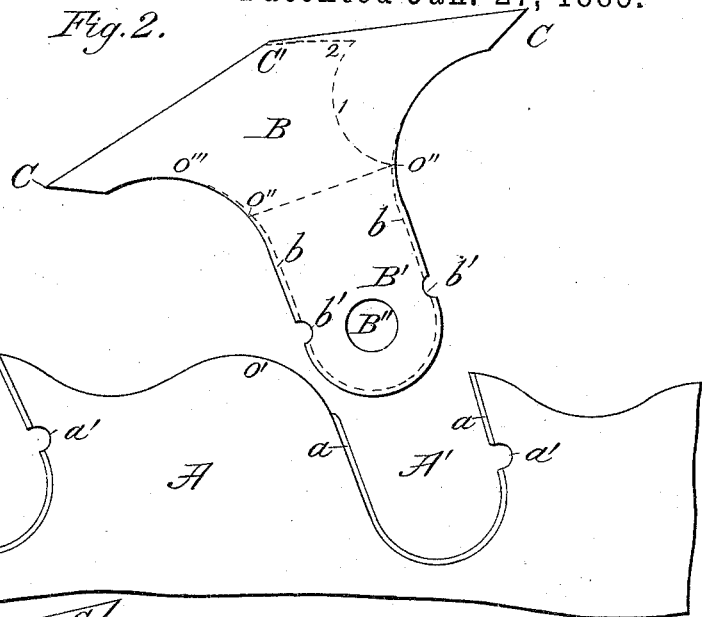
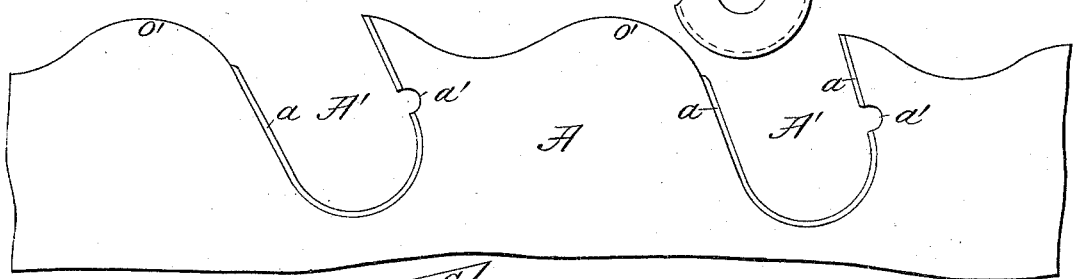
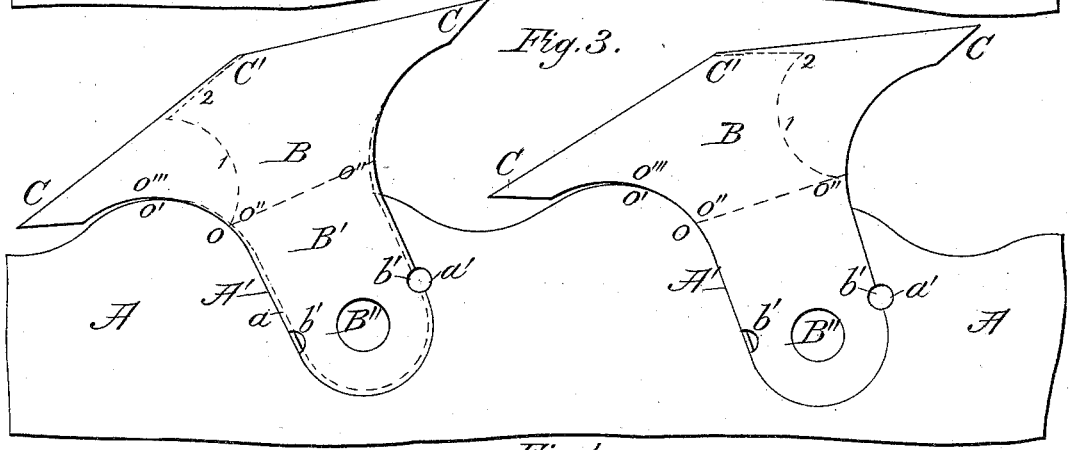
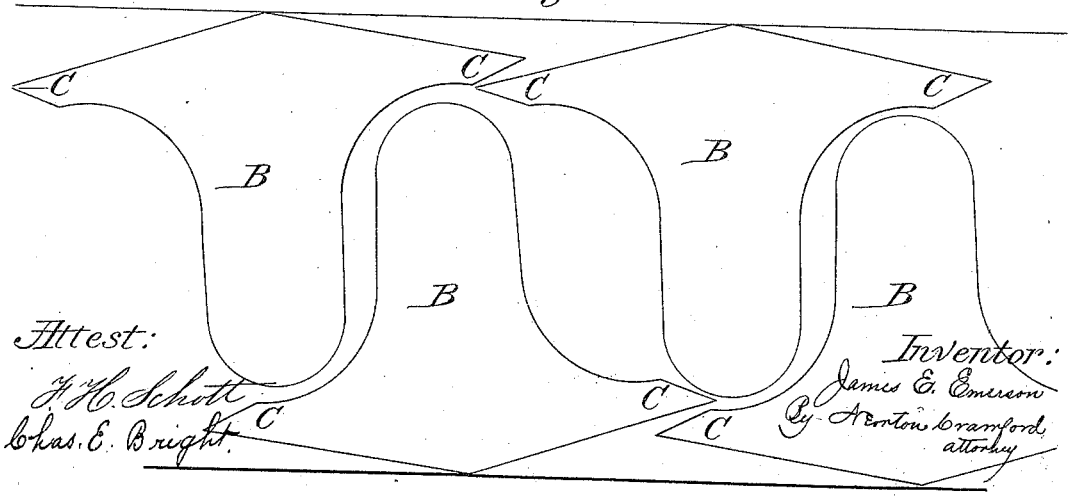
Attest:
H. H. Schott
Chas. E. Bright
Inventor:
James E. Emerson
By Newton Cranford,
attorney

UNITED STATES PATENT OFFICE.

JAMES E. EMERSON, OF BEAVER FALLS, PENNSYLVANIA.

INSERTIBLE SAW-TOOTH.

SPECIFICATION forming part of Letters Patent No. 311,301, dated January 27, 1885.

Application filed December 23, 1884. (No model.)

*To all whom it may concern:*

Be it known that I, JAMES E. EMERSON, a citizen of the United States, residing at Beaver Falls, in the county of Beaver and State of Pennsylvania, have invented certain new and useful Improvements in Insertible Saw-Teeth, of which the following is a specification, reference being had to the accompanying drawings.

My invention relates to insertible teeth for circular saws, which are not only insertible and removable, but also in making them with two cutting edges or points, one cutting-edge pointing in one direction and the other in the opposite direction; and it consists in the construction of the teeth and the saw-blade to receive the teeth, to admit of insertion, removal, and reversal of the teeth in, from, and to the saw-blade, as will be fully described hereinafter.

In the drawings, Figure 1 represents a section of a saw-blade constructed to receive the improved teeth. Fig. 2 represents a tooth ready to be inserted in the saw-blade. Fig. 3 represents a section of a saw with teeth inserted; and Fig. 4 represents a plate of steel with blank teeth as in section, showing how the blank teeth as improved in form are cut to save material.

A represents a section of a saw-blade having the inclined open recesses or seats A' for the reception of the teeth. This recess A' is made in the form shown, and has a half-circle at its base and a $\wedge$-shaped projecting rib, $a$, worked on the slightly-diverging opposite sides of the recess from point $o$ on the saw-blade around to the termination of the recess at the throat-opening on the opposite side. At point $a'$ is a half-round hole in the saw-blade.

B represents the reversible tooth having the two opposite cutting-edges C equidistant from point C' through the center of the tang of the tooth B', which is made to perfectly fit in the recess A', and is slightly narrower in width at the commencement of the circle-line at its base than at the opening of the recess at point $o$ of the saw-blade. At point $o''$ to point $o'''$ is a concave circle on each side of the tooth B, that will fit upon and bear against the saw-blade from point $o$ to point $o'$, which gives to the tooth support as against the thrust in the action of cutting the kerf in sawing. From point $o''$ around in the edges of the tang of tooth B to its opposite side is cut a V-shaped groove, $b$, to exactly fit upon the angular rib $a$ of the recess A' in the saw-blade.

$b'$ $b'$ are half-round rivet-holes in the tang B' of tooth B, and so situated that when the tang of the tooth is inserted in the recess the half-circle hole will exactly coincide with hole $a'$ in the saw-blade, when a rivet is inserted in the usual way to hold the tooth securely in place.

B'' is a hole through the tang B' of tooth B, for the insertion of a punch to assist in the removal of the tooth from the recess whenever it is to be removed from its position.

Double-edged reversible and insertible saw-teeth constructed and inserted within an inclined recess of a saw-blade, as above described, are as safe as any insertible teeth can be, and by using one cutting-edge C until it is worn back by filing to the dotted line 1 in the throat and dotted lines 2 on the outer circumference of the tooth, then the teeth are removed and reversed in position, when a new set of teeth are ready for use, thus making it true that a double-edged reversible tooth will do double the sawing that a single-edged tooth can.

I do not claim, broadly, for a double-edged tooth, or a tooth having two cutting-edges that can be reversed and use successively both cutting-edges, as I am aware of Patent No. 130,659, dated August 20, 1872, which shows a tooth having twin or two cutting-edges, but of an entirely different construction from mine, and believed to be impractical in use, because it has no secure means to hold the teeth in their seats, as the thrust against the teeth in sawing tends to cause a lateral spring upon them, and hence the points would project, catch in the kerf, and be entirely destroyed, by reason that there is too great a leverage between the cutting-edges and the point at which the teeth are held in the recesses of the saw-blade.

I am also aware of Patent No. 171,604, dated December 28, 1875, that shows a double cutting or two-edged tooth similar to mine in so far as the two cutting-edges are concerned, but dissimilar in all else, both in construction and purpose, as the tang of this tooth is about six-sevenths of a circle, inserted in a spring jaw-piece, which in turn is forced into an opening or recess wider at its outer edge than at its seat, so as to tightly compress the circular tang of the tooth in its grasp and yet allow it to rotate in its seat. This tooth is not calculated to be taken out of its seat to be reversed in its position, as the intention was to have the saw cut through the length of a log, then reverse its revolution and the feed mechanism, so that instead of gigging back the carriage and log thereon, the saw would "automatically" rotate or turn the saw-tooth to present its opposite edge to cut backward through the log, as the log was reciprocated in the reverse direction to that first presented to the saw. This construction is also believed to be impractical, because the purpose was to have the teeth rotate partially in the jaw-piece when the revolution of the saw was reversed; but no description is given of any means by which the teeth can rotate or change their position to have the saw cut backward, and because the teeth could not be held without the jaw-piece, while in my invention the reversible saw-teeth are held in the saw-blade.

In Fig. 4 is shown how the blank teeth are cut by dies from a plate of steel, in which there is less waste of metal than by any other known form of teeth.

Having thus fully described my invention, what I claim, and desire to secure by Letters Patent, is—

1. A reversible saw-tooth, B, having two opposite cutting-edges, C, a tang, B', having straight opposite sides, intersected at their outer termini with curved lines, to form a dust-space on the cutting side and a support on the saw-blade on the opposite side, at their inner termini with the half-circle base, and having opposite half-circle rivet-holes $b'$, substantially as described and shown.

2. The combination of the double-edged reversible saw-tooth B, having opposite cutting-edges C, tang B', having straight opposite sides, intersected at their outer termini with curved lines and at their inner termini with a half-circle base, and having opposite half-circle rivet-holes, $b'$, with the saw-plate A, having the inclined recess A', to receive the tang of the tooth, and rivet-hole $a'$, to coincide with half-circle hole $b'$ in the tang of the tooth, substantially as described.

In testimony whereof I affix my signature in presence of two witnesses.

JAMES E. EMERSON.

Witnesses:
  JOHN McCOWIN,
  CHARLES P. WALLACE.